(12) United States Patent
Schneider

(10) Patent No.: US 11,566,720 B2
(45) Date of Patent: Jan. 31, 2023

(54) ELECTRICALLY ACTUATED VALVE

(71) Applicant: Robert Bosch GmbH, Stuttgart (DE)

(72) Inventor: Claus Schneider, Burgsinn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/405,591

(22) Filed: Aug. 18, 2021

(65) Prior Publication Data
US 2022/0057009 A1     Feb. 24, 2022

(30) Foreign Application Priority Data
Aug. 20, 2020 (DE) .................. 10 2020 210 547.2

(51) Int. Cl.
*F16K 27/02* (2006.01)
*F16K 31/06* (2006.01)

(52) U.S. Cl.
CPC .......... *F16K 27/029* (2013.01); *F16K 31/061* (2013.01)

(58) Field of Classification Search
CPC .... F16K 27/029; F16K 27/048; F16K 31/061; F16K 31/0679
See application file for complete search history.

(56) References Cited

U.S. PATENT DOCUMENTS

| | | | | |
|---|---|---|---|---|
| 5,048,569 A | * | 9/1991 | Stoll ................... | F15B 13/0817 137/884 |
| 5,348,047 A | * | 9/1994 | Stoll ................... | F15B 13/0896 137/554 |
| 6,006,783 A | * | 12/1999 | Luhmann ............ | F15B 13/0857 137/554 |
| 6,109,298 A | * | 8/2000 | Kaneko ............... | F15B 13/0828 137/884 |
| 6,164,335 A | * | 12/2000 | Hayashi .............. | F15B 13/0828 137/884 |
| 7,070,161 B2 | * | 7/2006 | Piehl ................... | F16K 31/0613 251/129.08 |
| 7,159,848 B2 | * | 1/2007 | Brennen ............... | F16K 27/045 251/304 |
| RE41,299 E | * | 5/2010 | Atkin .................... | F16K 27/003 137/271 |
| 9,512,933 B2 | * | 12/2016 | Nalgirkar ............. | F16K 27/048 |
| 10,167,962 B2 | * | 1/2019 | Itoh ..................... | F16K 11/0712 |
| 11,028,935 B2 | * | 6/2021 | Beck ....................... | F16K 31/02 |
| 2004/0140443 A1 | * | 7/2004 | Miyata ................. | F15B 13/086 251/291 |
| 2005/0127314 A1 | | 6/2005 | Piehl et al. | |
| 2005/0282426 A1 | | 12/2005 | Nagashima et al. | |
| 2019/0120400 A1 | | 4/2019 | Delannes et al. | |

(Continued)

FOREIGN PATENT DOCUMENTS

| DE | 698 14 499 T2 | 3/2004 |
|---|---|---|
| DE | 10 2009 030 887 A1 | 12/2010 |

(Continued)

*Primary Examiner* — Umashankar Venkatesan
(74) *Attorney, Agent, or Firm* — Maginot, Moore & Beck LLP

(57) ABSTRACT

An electrically actuated valve with a hydraulic unit includes a valve housing and at least one electric actuator. Electronics are fastened to the hydraulic unit and at the same time are precisely positioned so that a seal between the electronics and the actuator does not shift or fold over on itself. To this end, a positioning device is formed between the electronics and the hydraulic unit.

11 Claims, 3 Drawing Sheets

(56) References Cited

U.S. PATENT DOCUMENTS

2019/0372259 A1* 12/2019 Schneider ............ H01R 13/113
2020/0200282 A1*  6/2020 Promnitz ............. F16K 27/029
2021/0396329 A1* 12/2021 Mita ................... F16K 27/029

FOREIGN PATENT DOCUMENTS

| DE | 10 2011 122 517 A1 | 7/2013 |
| DE | 10 2016 214 244 A1 | 2/2018 |
| DE | 10 2018 208 614 A1 | 12/2019 |
| DE | 10 2018 009 853 A1 | 6/2020 |

* cited by examiner

ELECTRICALLY ACTUATED VALVE

This application claims priority under 35 U.S.C. § 119 to patent application no. DE 10 2020 210 547.2, filed on Aug. 20, 2020 in Germany, the disclosure of which is incorporated herein by reference in its entirety.

BACKGROUND

The disclosure relates to an electrically actuated valve.

In the case of electrically actuated valves, it is known that a valve body is arranged in an approximately cuboidal valve housing so as to be displaceable by means of electric actuators on both sides. The electric actuators have coils and armatures, which are accommodated in a housing. To control the actuators, what are known as on-board electronics (OBE) are provided, which are electrically connected to the two actuators. An electronics housing of the on-board electronics is fastened to the valve housing. In this case, seals are mounted between the actuator housings and the portions of the electronics housing that are adjacent to said actuator housings, in order to seal the electrical connections and, additionally, also the electronics and the actuators with respect to ambient influences, in particular moisture.

Since these seals are mechanically relatively unstable, they must be clamped between the electronics housing and the actuator housing by a precise assembly of the two housings.

According to the prior art, this precision is achieved by an assembly device which is technically complex and therefore costly.

SUMMARY

The object of the disclosure is therefore to create an electrically actuated valve with which the assembly of the at least one seal is simplified in terms of the device technology and is less costly.

This object is achieved by an electrically actuated valve described below.

Further advantageous embodiments of the disclosure are described below.

The electrically actuated valve described herein has a valve housing and at least one electromagnetic actuator which has an actuator housing. Electronics are also provided and are accommodated in an electronics housing. A seal is arranged, in particular clamped, between the actuator housing and the electronics housing. In accordance with the disclosure, a positioning device is provided or formed on the valve and is used to align the electronics housing with the actuator housing and thus with the seal (or vice versa). The positioning device according to the disclosure can therefore also be referred to as a positioning aid. The alignment is performed during the assembly. An electrically actuated valve with a self-aligning electronics housing is thus created, with which the assembly or the clamping of the at least one seal is simplified in respect of the valve technology and is less costly.

If the at least one actuator housing is fastened to the valve housing, the positioning device can be formed between the electronics housing and the valve housing and in this way can indirectly align the electronics housing with the at least one actuator housing (or vice versa).

In a preferred application, an actuator housing is fastened to the valve housing on each of two mutually opposed sides.

If both actuator housings extend along a valve longitudinal axis, they can act on a valve body counter to one another.

In a particularly preferred embodiment of the positioning device according to the disclosure, there are two combinations consisting in each case of a pin and a corresponding recess. The two pins are used as alignment pins, which are introduced into the two recesses during the assembly. Furthermore, such alignment pins are also used for a precise fixing of the electronics housing in relation to the at least one actuator housing during the operation of the valve according to the disclosure. The tightness of the at least one seal over the service life of the valve is thus increased.

The positioning device acts particularly precisely if the pins and recesses extend transverse to the valve longitudinal axis.

In a variant, the two pins are formed on the electronics housing, whereas the two recesses are formed on the valve housing.

From a manufacturing viewpoint, it is beneficial if the electronics housing with the two pins is an aluminum part or plastics part.

The positioning device acts particularly precisely if the two pin-and-recess combinations are arranged at the greatest possible distance from one another. This is the case, for example, if the two combinations are in each case arranged adjacently to an actuator-side edge of a surface of the valve housing facing the electronics housing.

In a variant with the pin on the electronics housing and the recesses on the valve housing, the two recesses are in this case each arranged on an actuator-side edge of the surface of the valve housing facing the electronics housing.

If a first pin is circular-cylindrical, and if a second pin—based on a likewise circular-cylindrical basic form—has flattened portions for example in the direction of the valve longitudinal axis, the second pin can precisely align the electronics housing transverse to the valve longitudinal axis, and at the same time can compensate for any length deviations along the valve longitudinal axis. For example, a total of two pairs of flattened portions can be provided. The two pairs are arranged opposite one another on the circumference of the second pin. Each pair has flattened positions inclined relative to one another.

An electrical connection between the electronics and the associated actuator is provided inside the at least one seal in each case. This electrical connection can be formed by at least one flat plug (flat plug prong) and at least one flat plug receptacle.

BRIEF DESCRIPTION OF THE DRAWINGS

An exemplary embodiment of the electrically actuated valve according to the disclosure is shown in the figures.

In the figures.

DETAILED DESCRIPTION

Figure 1:
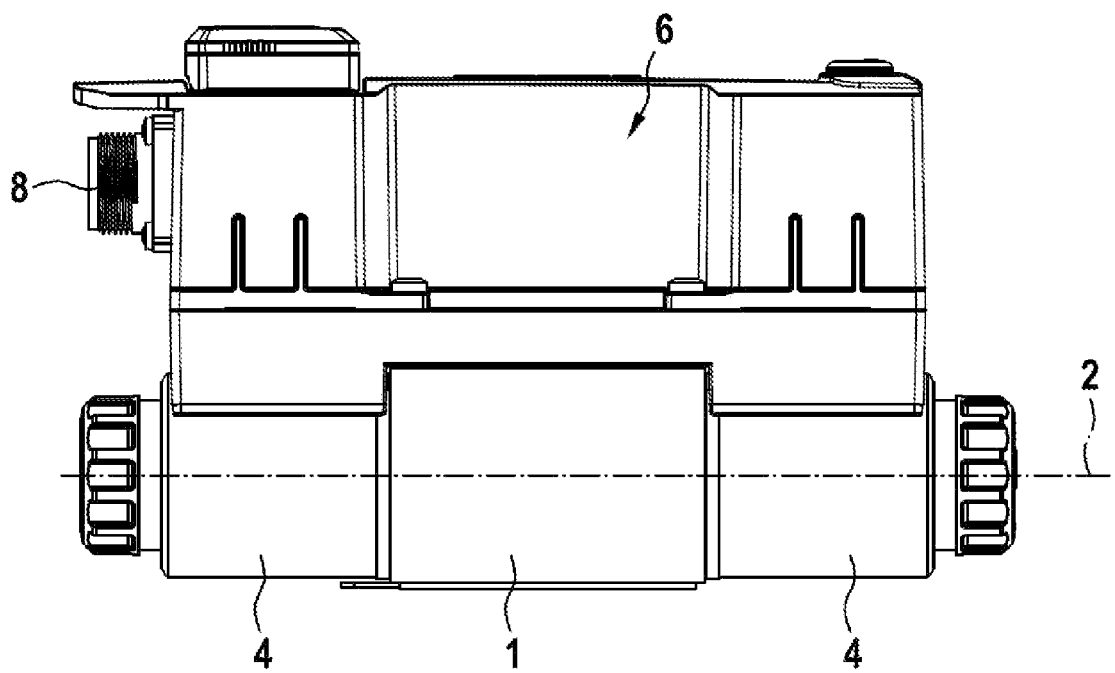
FIG. 1 shows a side view of the electrically actuated valve according to the disclosure in accordance with the exemplary embodiment.

FIG. 1 shows, in a side view, the exemplary embodiment of the electrically actuated valve according to the disclosure. A valve gate (not shown) is displaceable along a longitudinal axis 2 in an approximately cuboidal metallic valve housing 1. This displacement is realized by means of two electromagnetically actuators acting counter to one another, the coils of which actuators are accommodated in approximately circular-cylindrical actuator housings 4.

An electronics housing 6 is placed on a (in FIG. 1 upper) side of the hydraulic unit formed of the valve housing 1 and the two actuators 4, in which electronics housing there are accommodated electronics (not shown). The electronics are used for open-loop and closed-loop control and power supply of the two actuators, so that for example a 4/3-way valve formed in the valve housing 1 can be moved continuously. The electronics are supplied with power and actuated by means of a plug 8.

Figure 2:
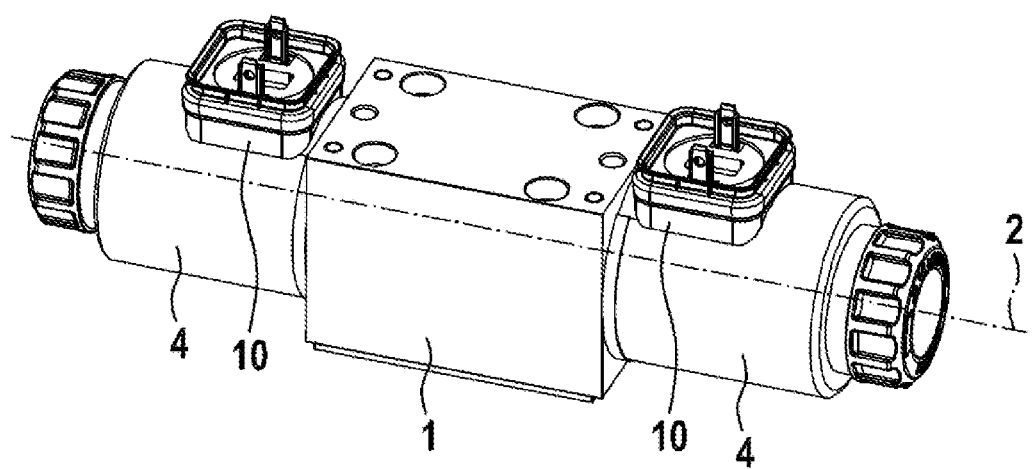
FIG. 2 shows a perspective view of a hydraulic unit of the valve from FIG. 1.

FIG. 2 shows the hydraulic unit, consisting of the approximately cuboidal valve housing 1 and the two actuators. A socket 10 is formed on the outer circumference of each of the two cylindrical actuator housings 4, on a side facing the electronics housing 6 (not shown in FIG. 2) and is used to physically connect the actuator housing 4 to the electronics housing 6. Each socket 10 is formed with a rectangular edge which faces the electronics housing 6 and has rounded corners. A circumferential seal 12 is arranged on each of said edges.

The two seals 12 have, on their sides facing the electronics housing 6, a relatively thin circumferential lip. When assembling the hydraulic unit according to FIG. 2 with the electronics housing 6 (see FIG. 1), these two components must therefore be guided together in a precise manner. This is achieved by means of the positioning device according to the disclosure, which is explained with reference to FIGS. 4 and 5.

The prongs of two flat plugs can be seen inside the socket 10 or the seal 12, by means of which prongs the actuator is electrically connected to the electronics.

Figure 3:
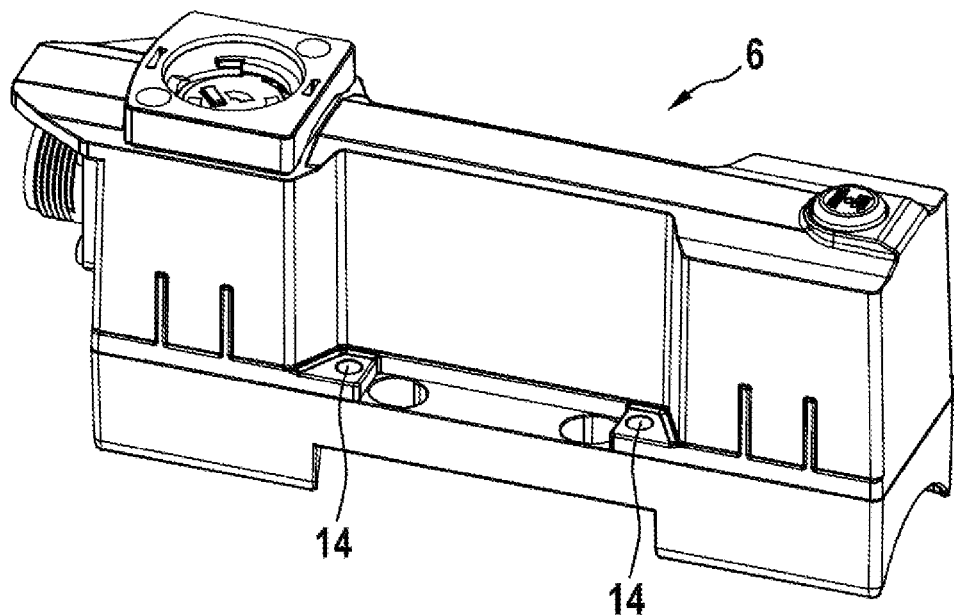
FIG. 3 shows a perspective view of the electronics of the valve from FIG. 1.

FIG. 3 shows the electronics housing 6 in a perspective view. Four through-recesses 14 are provided in order to fasten the electronics housing to the hydraulic unit according to FIG. 2, more specifically for fastening to the valve housing 1 of the hydraulic unit, and fastening screws are guided through said through-recesses.

Figure 4:
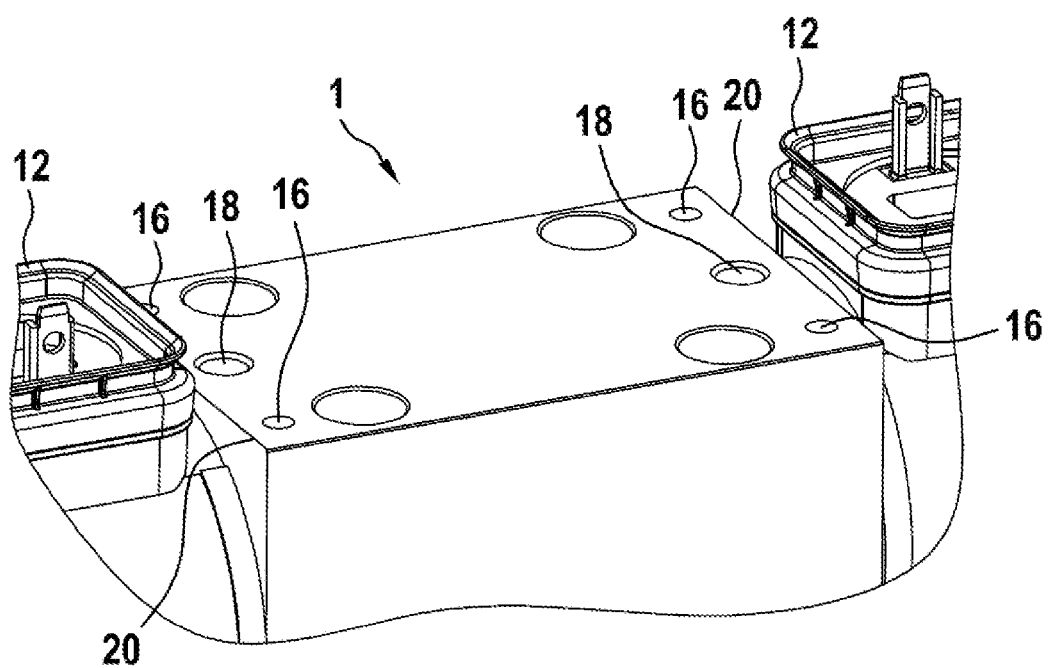
FIG. 4 shows a detail from FIG. 2.

FIG. 4 shows an enlargement of the hydraulic unit, in particular of the valve housing 1. In the shown surface of the valve housing 1 facing the electronics housing there are provided four threaded bores 16 for the fastening screws. Furthermore, two circular-cylindrical recesses 18 formed as bores are provided in this surface. These recesses are part of the alignment device according to the disclosure. In order to make the distance between the two recesses 18 along the longitudinal axis 2 as large as possible, the two recesses 18 are arranged directly adjacently to a corresponding actuator-side edge 20 of the shown surface of the valve housing 1.

Figure 5:
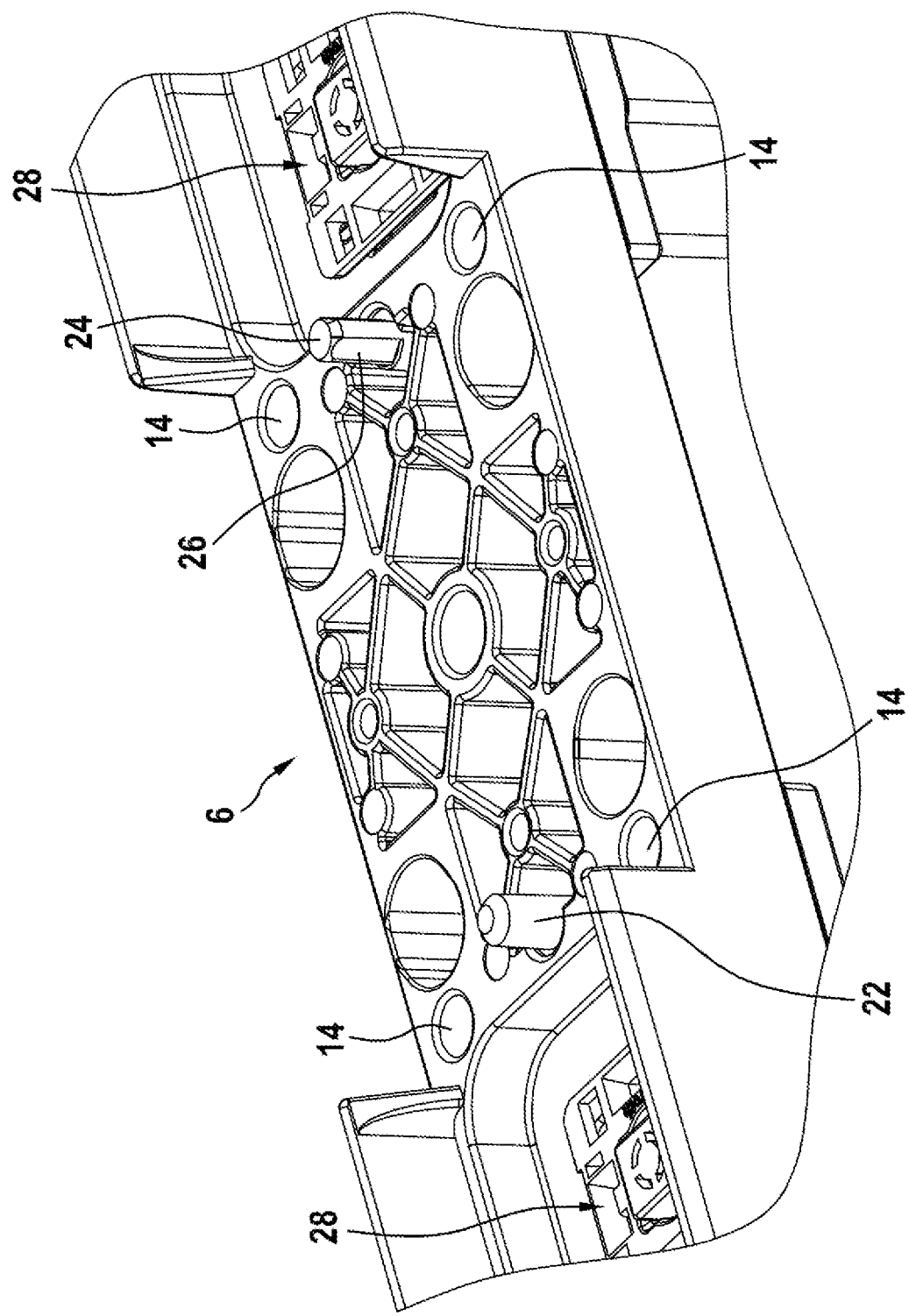
FIG. 5 shows a perspective view from below of the electronics of the valve from FIG. 3.

FIG. 5 shows a view of the (lower) side of the electronics housing 6 facing the hydraulic unit. Two pins 22, 24, which are associated with the alignment device according to the disclosure, extend from this side. The pins 22, 24 and the recesses 18 from FIG. 4 extend perpendicularly to the longitudinal axis 2 (see FIG. 1 or 2). The shown (lower) side has a grid structure (30) in the region between the pins 22, 24, which grid structure consists of struts and recesses, which increases the stability or the transverse rigidity and saves material.

The two pins 22, 24 are formed in one piece with the electronics housing 6 by aluminum die-casting or plastics injection molding. The pins 22, 24 differ in respect of their geometric design.

In order for the pins 22, 24 to be able to be introduced as easily as possible into the recesses 18 shown in FIG. 4, the two pins 22, 24 and the two recesses 18 each have a circular, circumferential bevel.

The first pin 22 is circular-cylindrical. The second pin 24 has a corresponding basic shape. In the second pin 24, however, there are provided two mutually opposed pairs of flattened portions 26, of which only one flattened portion 26 can be seen in FIG. 5. The total of four flattened portions 26 form respective surface portions. The two flattened portions 26 of a pair are adjacent to one another and are inclined relative to one another at an angle between 90 and 180 degrees.

As a result of these flattened portions 26, the second pin 24 has slight play in the corresponding recess 18 (see FIG. 4) along the longitudinal axis 2 (see FIG. 1 or 2). It is thus possible to compensate for a potential small difference between, on the one hand, the distance between the two recesses 18 and, on the other hand, the distance between the two pins 20, 24. By contrast, an almost play-free positioning of the electronics housing 6 relative to the valve housing 1 and thus indirectly also relative the seals 12 is provided transverse to the longitudinal axis 2.

Due to the positioning device according to the disclosure, replacement electronics with a corresponding replacement electronics housing 6 can be placed onto the two seals 12, for example also for servicing purposes, in an installed state of the hydraulic unit of the valve, without displacing the two seals or crushing or damaging their lips.

The flat plug receptacles 28, into which the flat plug prongs of the actuators (see FIG. 2) are introduced, are also shown in FIG. 5.

Disclosed is an electrically actuated valve with a hydraulic unit consisting of a valve housing and at least one electric actuator. Electronics are fastened to the hydraulic unit and precisely positioned at the same time, so that a seal between the electronics and the actuator is not shifted or folded over on itself. To this end, a positioning device is formed between the electronics and the hydraulic unit.

LIST OF REFERENCE SIGNS 1 valve housing
2 longitudinal axis
4 actuator housing
6 electronics housing
8 plug
10 socket
12 seal
14 through-recess
16 threaded bore
18 recess
20 edge
22 first pin
24 second pin
26 flattened portion
28 flat plug receptacle
30 grid structure

What is claimed is:
1. An electrically actuated valve, comprising:
a valve housing;
a first electromagnetic actuator having a first actuator housing;
a second electromagnetic actuator having a second actuator housing, the first actuator housing and the second actuator housing being arranged on two mutually opposed sides of the valve housing and extending along a longitudinal axis of the electrically actuated valve;
an electronics housing containing electronics;
a seal arranged between the first and second actuator housings and the electronics housing; and
a positioning device configured to align the electronics housing with the first and second actuator housings.

2. The valve according to claim 1, wherein the positioning device is formed by a first structural combination that includes a first pin and a first corresponding recess, and a second structural combination that includes a second pin and a second corresponding recess.

3. The valve according to claim 2, wherein the first pin, the first corresponding recess, the second pin, and the second corresponding recess extend transverse to the longitudinal axis.

4. The valve according to claim 2, wherein:
the first pin is configured to be circular-cylindrical, and
the second pin is configured to possess flattened portions.

5. The valve according to claim 1, further comprising at least one flat plug and at least one flat plug receptacle that are arranged inside the seal.

6. An electrically actuated valve, comprising:
a valve housing;
at least one electromagnetic actuator having a respective actuator housing;
an electronics housing containing electronics;
a seal arranged between the respective actuator housing and the electronics housing; and
a positioning device configured to align the electronics housing with the respective actuator housing,
wherein:
the positioning device is formed by a first structural combination that includes a first pin and a first corresponding recess, and a second structural combination that includes a second pin and a second corresponding recess,
the first pin, the first corresponding recess, the second pin, and the second corresponding recess extend transverse to the longitudinal axis,
the first pin and the second pin are formed on the electronics housing, and
the first corresponding recess and the second corresponding recess are formed on the valve housing.

7. The valve according to claim 6, wherein:
the respective actuator housing is fastened to the valve housing, and
the positioning device is arranged between the electronics housing and the valve housing.

8. The valve according to claim 6, wherein:
the at least one electromagnetic actuator having a respective actuator housing includes (i) a first electromagnetic actuator having a first actuator housing, and (ii) a second electromagnetic actuator having a second actuator housing, and
the first actuator housing and the second actuator housing are arranged on two mutually opposed sides of the valve housing and extend along a longitudinal axis of the valve.

9. The valve according to claim 6, wherein the electronics housing, the first pin, and the second pin are integrally formed as an injection-molded plastics part.

10. The valve according to claim 9, wherein the electronics housing has a grid structure located between the first pin and the second pin.

11. An electrically actuated valve, comprising:
a valve housing;
at least one electromagnetic actuator having a respective actuator housing;
an electronics housing containing electronics;
a seal arranged between the respective actuator housing and the electronics housing; and
a positioning device configured to align the electronics housing with the respective actuator housing,
wherein the positioning device is formed by a first structural combination that includes a first pin and a first corresponding recess, and a second structural combination that includes a second pin and a second corresponding recess, and
wherein the first and second structural combinations are each arranged adjacent to an actuator-side edge of a surface of the valve housing facing the electronics housing.

* * * * *